United States Patent
Lang et al.

(10) Patent No.: US 11,263,852 B2
(45) Date of Patent: Mar. 1, 2022

(54) METHOD, ELECTRONIC DEVICE, AND COMPUTER READABLE STORAGE MEDIUM FOR CREATING A VOTE

(71) Applicant: BEIJING DAJIA INTERNET INFORMATION TECHNOLOGY CO., LTD., Beijing (CN)

(72) Inventors: Zhidong Lang, Beijing (CN); Xiaorui Wang, Beijing (CN); Luo Zhang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 16/882,510

(22) Filed: May 24, 2020

(65) Prior Publication Data
US 2020/0286318 A1 Sep. 10, 2020

(30) Foreign Application Priority Data
May 24, 2019 (CN) .......................... 201910440402.6

(51) Int. Cl.
*G07C 13/00* (2006.01)
*G10L 15/18* (2013.01)
*G10L 15/26* (2006.01)
*G10L 15/08* (2006.01)

(52) U.S. Cl.
CPC .......... *G07C 13/00* (2013.01); *G10L 15/1815* (2013.01); *G10L 15/26* (2013.01); *G10L 2015/088* (2013.01)

(58) Field of Classification Search
CPC .................. G07C 13/00; G10L 15/1815
USPC ................... 235/5; 705/14.66; 455/41.2, 466
See application file for complete search history.

(56) References Cited

U.S. PATENT DOCUMENTS

| | | | | |
|---|---|---|---|---|
| 2004/0010797 A1* | 1/2004 | Vogel | ................ | H04N 21/44222 725/24 |
| 2005/0209859 A1* | 9/2005 | Tenembaum | ........... | G10L 15/26 704/277 |
| 2008/0010122 A1* | 1/2008 | Dunmire | ............ | H04N 7/17318 705/14.55 |
| 2010/0158218 A1* | 6/2010 | Dhawan | ............... | H04M 1/2478 379/88.18 |
| 2010/0263015 A1* | 10/2010 | Pandey | ............ | H04N 21/43615 725/153 |
| 2012/0046936 A1 | 2/2012 | Kandekar et al. | | |
| 2013/0237323 A1* | 9/2013 | Alman | .................. | A63F 13/798 463/42 |

(Continued)

FOREIGN PATENT DOCUMENTS

| | | |
|---|---|---|
| CA | 2317205 A | 2/2002 |
| CN | 103067754 A | 4/2013 |

(Continued)

*Primary Examiner* — Allyson N Trail
(74) *Attorney, Agent, or Firm* — Meunier Carlin & Curfman LLC

(57) ABSTRACT

Disclosed are a method, an electronic device, and a computer readable storage medium for creating a vote. The method includes: receiving a vote initiation instruction to obtain voice information inputted currently; determining textual information by recognizing the voice information; determining at least two option words based on semantic recognition of the textual information; generating a question stem of the vote based on the textual information; and generating voting options based on the option words for the vote.

18 Claims, 5 Drawing Sheets

(56) References Cited

U.S. PATENT DOCUMENTS

| | | | |
|---|---|---|---|
| 2014/0229962 A1* | 8/2014 | Findlay | H04N 21/44222 |
| | | | 725/13 |
| 2016/0044226 A1* | 2/2016 | Williams | H04N 7/181 |
| | | | 348/211.3 |
| 2016/0364118 A1* | 12/2016 | Foerster | G06F 3/167 |
| 2017/0154033 A1* | 6/2017 | Lee | G06F 40/274 |
| 2017/0270929 A1* | 9/2017 | Aleksic | G06F 40/295 |
| 2019/0189019 A1* | 6/2019 | Hammersley | G09B 5/062 |
| 2019/0192974 A1* | 6/2019 | Eatedali | A63F 13/69 |
| 2019/0251972 A1* | 8/2019 | Li | G10L 15/26 |
| 2020/0135186 A1* | 4/2020 | Huang | G10L 15/02 |
| 2020/0243094 A1* | 7/2020 | Thomson | G10L 15/22 |

FOREIGN PATENT DOCUMENTS

| | | |
|---|---|---|
| CN | 103369122 A | 10/2013 |
| CN | 103632332 A | 3/2014 |
| CN | 106227813 A | 12/2016 |
| CN | 106653002 A | 5/2017 |
| CN | 107172477 A | 9/2017 |
| CN | 107222757 A | 9/2017 |
| CN | 107481384 A | 12/2017 |
| CN | 107820112 A | 3/2018 |
| CN | 108711422 A | 10/2018 |
| CN | 108806671 A | 11/2018 |
| CN | 109474763 A | 3/2019 |

\* cited by examiner

Rule set = Question stem 1/ Question stem 2
Question stem 1 = next round [I] will play <option 1> or <option 2> ?
Option 1 =<Hero>
Option 2 =<Hero>
Hero = Pan Gu / Zhu Ba-jie / The goddess in the moon/ Shangguan Wan'er
Question stem 2 = [You] want to see <Option 3> or <Option 4> ?
Option 3 = <Map>
Option 4 = <Map>

Map = PUBG Island / Allenger /Island

METHOD, ELECTRONIC DEVICE, AND COMPUTER READABLE STORAGE MEDIUM FOR CREATING A VOTE

CROSS REFERENCE TO RELATED APPLICATION

This application claims priority to Chinese Patent Application No. 201910440402.6, filed with the Chinese Patent Office on May 24, 2019. The entire disclosure of the above application is incorporated herein by reference.

FIELD

The present disclosure relates to the technical field of computers, and in particular, to a method, an electronic device, and a computer readable storage medium for creating a vote.

BACKGROUND

Voting in the live stream is a way for a host to interact with viewers. The host can determine what will show for the subsequent live stream based on a received vote result of the viewers. For example, in some game live streams, the host can initiate a vote on a game character to be used in the next round, and adjust content of the live stream according to the vote result in a timely manner.

At present, in the conventional vote creation manner, the host needs to open a vote creation page, enter the question stem and voting options of a vote in the form of text in the page, and then click "Confirm" to initiate the vote. In the foregoing process, if the question stem and voting options have a large quantity of words, the text input operation is tedious and time-consuming, resulting in low vote creation efficiency and high difficulty in quickly creating the vote by the host.

SUMMARY

The present disclosure provides a method, an electronic device, and a computer readable storage medium for creating a vote.

In some embodiments, a method for creating a vote is provided. The method includes: receiving a vote initiation instruction to obtain voice information inputted currently; determining textual information by recognizing the voice information; determining at least two option words based on semantic recognition of the textual information; generating a question stem of the vote based on the textual information; and generating voting options based on the option words for the vote.

In some embodiments, an electronic device for creating a vote is provided. The electronic device includes: a processor; and a memory, configured to store an instruction that can be executed by the processor, where the processor is configured to execute the instruction to perform: receiving a vote initiation instruction to obtain voice information inputted currently; determining textual information by recognizing the voice information; determining at least two option words based on semantic recognition of the textual information; generating a question stem of the vote based on the textual information; and generating voting options based on the option words for the vote.

In some embodiments, a non-transitory computer readable storage medium for creating a vote is provided. When an instruction in the computer readable storage medium is executed by a central processing unit of an electronic device, the electronic device can perform the method for creating a vote according to the embodiments above.

It should be understood that, the foregoing general description and the following detailed description are only illustrative and explanatory. The present disclosure is not limited thereto.

BRIEF DESCRIPTION OF THE DRAWINGS

The accompanying drawings herein are incorporated into this specification and form part of this specification, showing embodiments conforming to the present disclosure, and are used together with this specification to explain the principles of the present disclosure, but do not constitute any improper limitation to the present disclosure.

DETAILED DESCRIPTION OF THE EMBODIMENTS

To make a person of ordinary skill in the art understand the technical solutions in the present disclosure better, the following describes the technical solutions in the embodiments of the present disclosure with reference to the accompanying drawings clearly and completely. It should be noted that, in the specification, claims, and accompanying drawings of the present disclosure, the terms "first", "second", and the like are intended to distinguish between similar objects but do not necessarily indicate a specific order or sequence. It should be understood that the data termed in such a way are interchangeable in proper circumstances so that the embodiments of the present disclosure described herein can be implemented in an order other than the order illustrated or described herein. Implementations described in the following example embodiments do not represent all implementations consistent with the present disclosure. On the contrary, they are only examples of apparatuses and methods that are consistent with some aspects of the present disclosure detailed in the attached claims.

Figure 1:
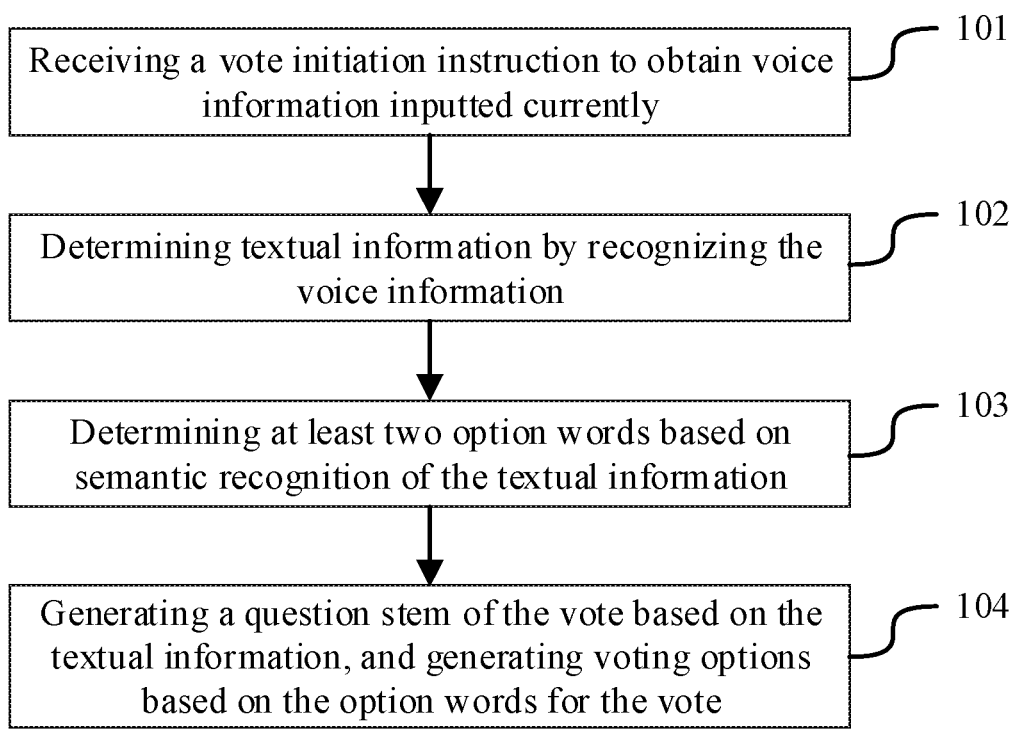
FIG. 1 is a flowchart of a method for creating a vote according to an example embodiment.

FIG. 1 is a flowchart of a method for creating a vote according to an example embodiment. The method can be used in an electronic device. As shown in FIG. 1, the method includes the following steps.

Step 101: receiving a vote initiation instruction to obtain voice information inputted currently.

Step 102: determining textual information by recognizing the voice information.

Step 103: determining at least two option words based on semantic recognition of the textual information.

Step 104: generating a question stem of the vote based on the textual information, and generating voting options based on the option words for the vote.

According to the method in the some embodiments, a speech input by a user is firstly recognized, and the question stem and voting options of a vote based on the voice recognition and semantic recognition can be determined to create the vote. The user does not need to input text for a long time as before. Therefore, a faster vote creation manner is provided for the user, and the vote creation efficiency is improved.

In some embodiments, determining textual information includes:
  determining a plurality of decoded results by decoding the voice information, wherein each decoded result corresponds to an initial score;
  for each of the decoded results,
    matching the decoded result with a plurality of preset phrases;
    adding one reward point to an initial score of the decoded result in response to that the decoded result matches with at least one of the preset phrases successfully; and
  determining a decoded result with a highest score as the textual information corresponding to the voice information.

In some embodiments, the method further includes: acquiring zone information when receiving the vote initiation instruction in a live stream; and determining the preset phrases based on the zone information.

In some embodiments, the method further includes: acquiring a live image when receiving the vote initiation instruction in a live stream; determining live textual information by recognizing the live image; and determining the preset phrases based on the live textual information.

In some embodiments, the method further includes: acquiring a title when receiving the vote initiation instruction in a live stream, where the title is used to indicate the subject of the live stream; and determining the preset phrases based on the title.

In some embodiments, the step of determining at least two option words includes: determining the option words by matching the textual information with a preset grammar rule, wherein the preset grammar rule is used to define a sentence pattern for creating the vote.

In some embodiments, the step of generating a question stem of the vote includes:
  determining a target word in the textual information, wherein the target word is assigned to a target part of speech;
  acquiring remaining textual information by removing the target word from the textual information; and
  determining the remaining textual information as the question stem.

In some embodiments, the method further includes: displaying a preview page of the vote in the first target area of a live stream.

The foregoing embodiment is merely a brief introduction of an implementation or various possible implementations of the present disclosure.

Figure 2:
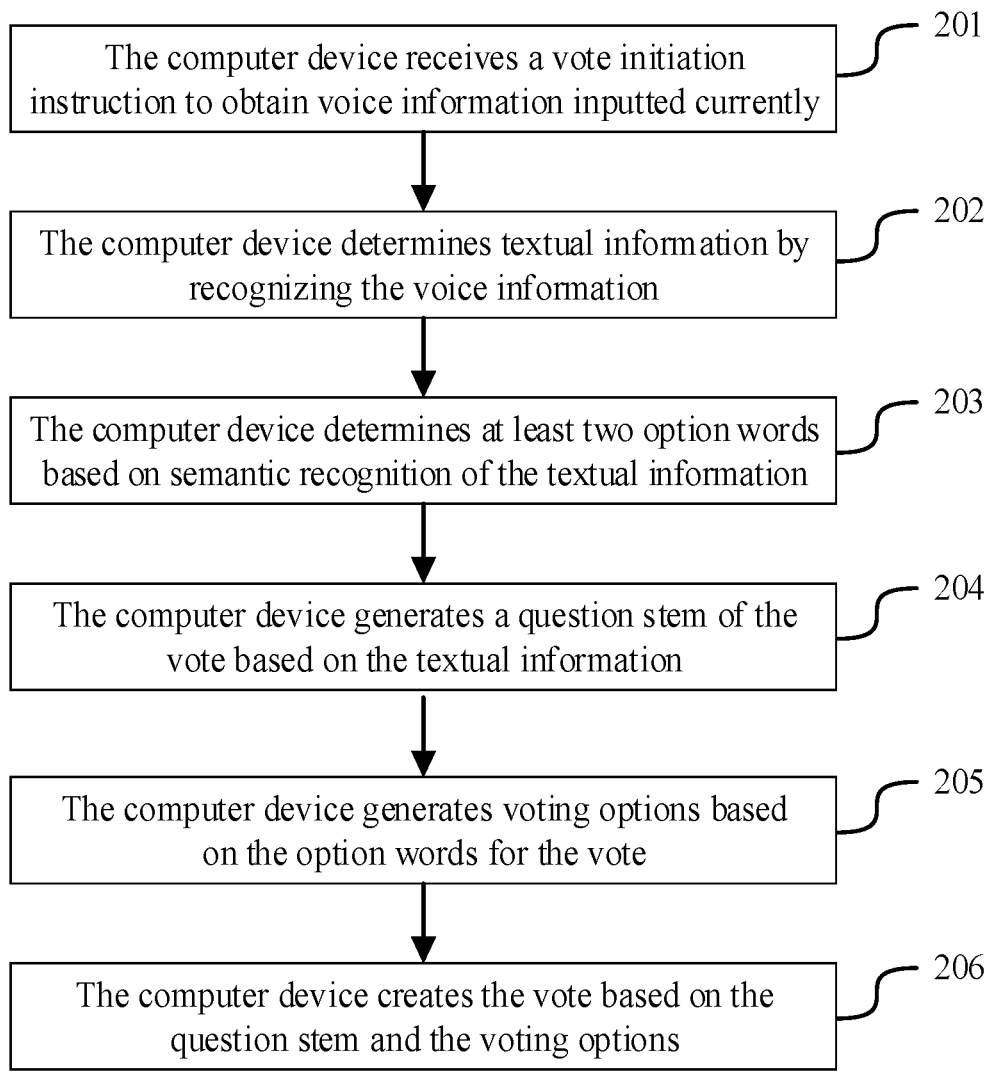
FIG. 2 is a flowchart of another method for creating a vote according to an example embodiment.

FIG. 2 is a flowchart of another method for creating a vote according to an example embodiment. In some embodiments, this method can be executed by an electronic device. For example, the electronic device can be a computer, a mobile phone, a tablet personal computer, and the like. As illustrated in FIG. 2, the method includes the following steps.

Step 201: An electronic device receives a vote initiation instruction to obtain voice information inputted currently.

Any application with an interactive function can be installed on the electronic device. For example, the application can provide a video sharing function. In some embodiments, taking the application for live streaming as an example. During the running process of the application, when receiving the vote initiation instruction, the electronic device can invoke a related interface and perform the subsequent vote creation steps in response to the vote initiation instruction.

In some embodiments, the vote initiation instruction is used to instruct the electronic device to start to create a vote. In some embodiments, the vote initiation instruction is further used to trigger the voice acquisition.

Figure 3:
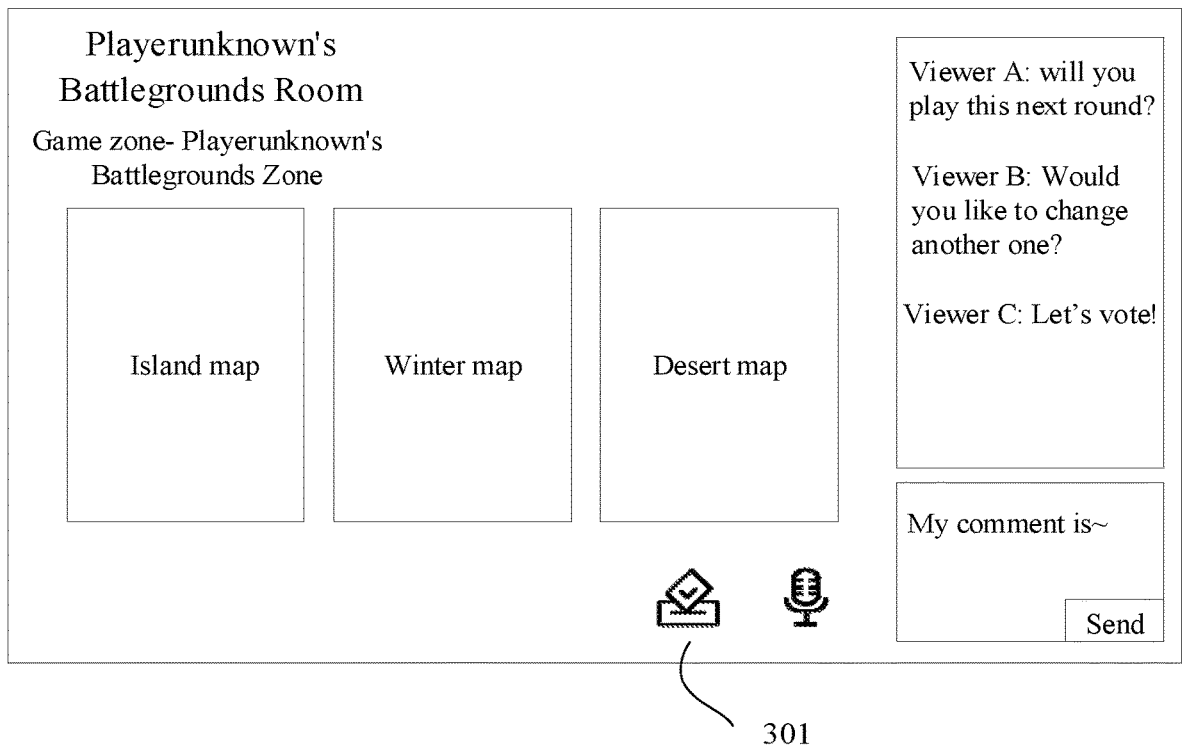
FIG. 3 is a diagram of a live stream page according to an example embodiment.

In some embodiments, the vote initiation instruction may be triggered by a click operation on a target control on a live stream page. The target control may be a control used to indicate a vote function entrance. FIG. 3 is a diagram of a live stream page according to an example embodiment. In the diagram of the live stream page shown in FIG. 3, elements such as a live image, live information, bullet screen interactive information and functional buttons are included. A vote control 301 may be the target control indicating the vote function entrance. A user can click the target control to trigger the generation of the vote initiation instruction.

After the electronic device receives the vote initiation instruction, a voice acquisition function is enabled to obtain the voice information inputted by the user. The electronic device may further provide a confirm icon, to confirm that the user has finished the speech input operation.

After the electronic device enables the speech acquisition function, the user can input speech in target duration. The target duration may be set by a developer according to an actual implementation scenario. If the electronic device detects a click operation on the confirm icon in the target duration, it is determined that the speech input is complete. In some embodiments, after obtaining the voice information, the electronic device disables the speech acquisition function. If the electronic device fails to detect a click operation on the confirm icon in the target duration, it is determined that the user fails to finish the speech input in the target duration, and the electronic device disables the speech acquisition function, and prompts the user to input the voice information again.

Figure 4:
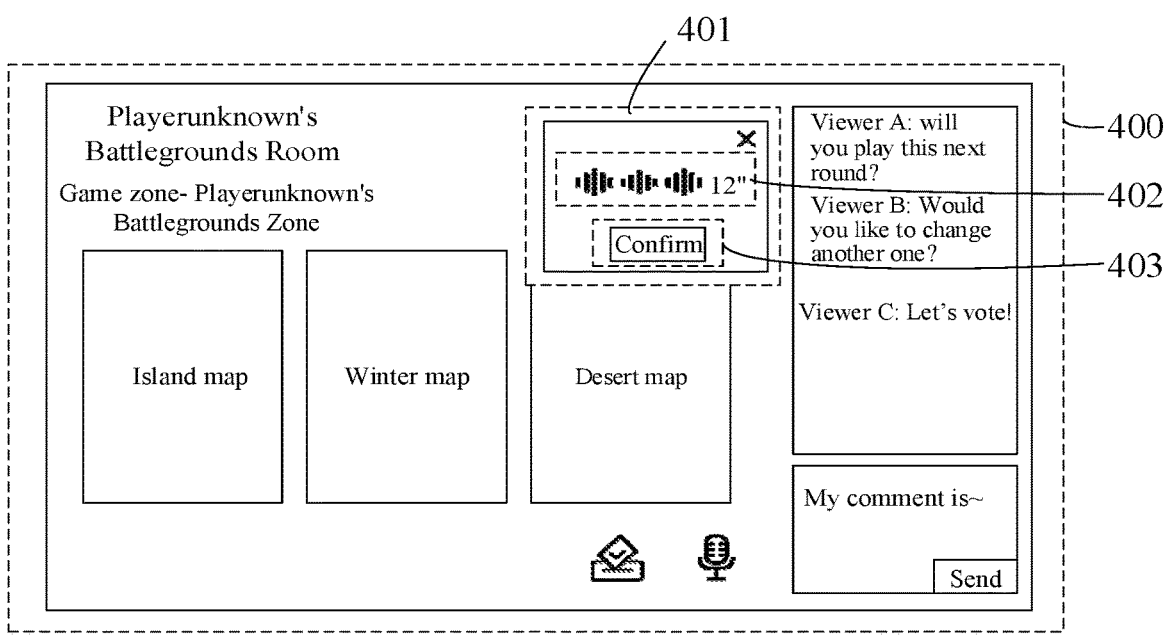
FIG. 4 is a diagram of another live stream page according to an example embodiment.

To reflect the specific status of speech input more visually, the electronic device may display current speech input duration, voice input status, and the like. In some embodiments, the electronic device may display a speech input window in the first target area of the live stream page. The speech input window may include a speech input status display area and a confirm icon. The first target area may be located anywhere in the live stream page. FIG. 4 is a schematic diagram of a live stream page according to an example embodiment. Taking that the first target area is a right upper area of the live stream page 400 as an example, the speech input window displayed in the first target area 401 includes a speech input status display area 402 and a confirm icon 403. The figure in the area 402 is used to indicate current speech input duration. The broken-line shape is used to indicate volume change of the input voice. The confirm icon 403 is configured to provide a function of confirming that the speech input is complete.

In the foregoing speech input process, sentence patterns used by users can be defined to reduce the complexity of subsequent semantic recognition and accurately obtain the question stem and voting options of a vote. In some embodiments, in response to detecting that a user is using a vote creation function for the first time, the electronic device prompts the user to use a preset sentence pattern for speech input. The preset sentence pattern may include a common sentence pattern that describes a question stem, for example, "Which one do you want to play in the next round: . . . or . . . ?", and "Which one do you want to watch: . . . or . . . ?".

Step 202: The electronic device determines textual information by recognizing the voice information.

In some embodiments, the electronic device converts the voice information into the textual information by the following steps.

Step 1: The electronic device determines a plurality of decoded results by decoding the voice information, where each decoded result corresponds to an initial score.

The decoded result is used to indicate textual information that may correspond to the voice information after decoding. A plurality of groups of textual information corresponding to the voice information may be obtained in the decoding process, that is, a plurality of decoded results may be obtained.

In some embodiments, firstly, the electronic device pre-processes obtained voice information, to remove invalid voice information such as mute information. Then, the electronic device extracts acoustic features of the voice information, inputs the extracted acoustic features into an acoustic model to obtain phoneme information. Further the phoneme information is searched in a pronunciation dictionary to obtain a plurality of decoded results corresponding to the phoneme information. Finally, the electronic device obtains probabilities indicating that the decoded results are correct decoded results based on a language model. Based on the probabilities, each decoded result is assigned with an initial score. The decoded result with a higher probability is assigned with a higher initial score. It should be noted that, the mentioned method of obtaining the decoded result is merely an example. The embodiment of the present invention does not impose any limitation to the specific decoding method of obtaining the decoded results.

Step 2: The electronic device matches the decoded result with a plurality of preset phrases.

The preset phrases may be set by a developer based on an actual implementation scenario. In some embodiments, the preset phrases may include popular phrases that are frequently used, such as hero names, map names, and the like in popular online games.

Step 3: the electronic device adds one reward point to the initial score of the decoded result, in response to that the decoded result matches with at least one of the preset phrases successfully.

Here, for each of the decoded results, steps 2-3 are performed to get decoded results with various total scores.

The reward point is used to indicate the match between the decoded result and the preset phrase. The reward point may be any preset value.

Step 4: The electronic device determines the decoded result with the highest total score as textual information corresponding to the voice information.

After the decoded results are completely matched with the preset phrases, the electronic device compares the various scores, and determines the decoded result of the highest score as the textual information corresponding to the voice information.

In the foregoing voice recognition process, as the preset phrases are set, reward points are assigned to the decoded results matching the preset phrases, and the decoded result with the highest score is determined as the decoded result of the voice information, so that the output probability of the preset phrases is increased. The preset phrases include popular phrases and phrases frequently used in the voting options. Generally, it may be considered that a vote initiating user wants to initiate a vote for the popular phrases or voting options. As such, increasing the output probability of the preset phrases in a voice recognition process can improve the accuracy of a voice recognition result.

Step 203: The electronic device determines at least two option words based on semantic recognition of the textual information.

Semantic recognition is used to integrate the textual information, according to a preset grammar rule, to output textual information meeting the grammar logic better. In some embodiments, during semantic recognition, the electronic device may extract a target phrase in the textual information according to the preset grammar rule. In some embodiments, the electronic device determines the option words by matching the textual information with a preset grammar rule, where the preset grammar rule is used to define a sentence pattern for creating the vote.

Figures 5, 6:
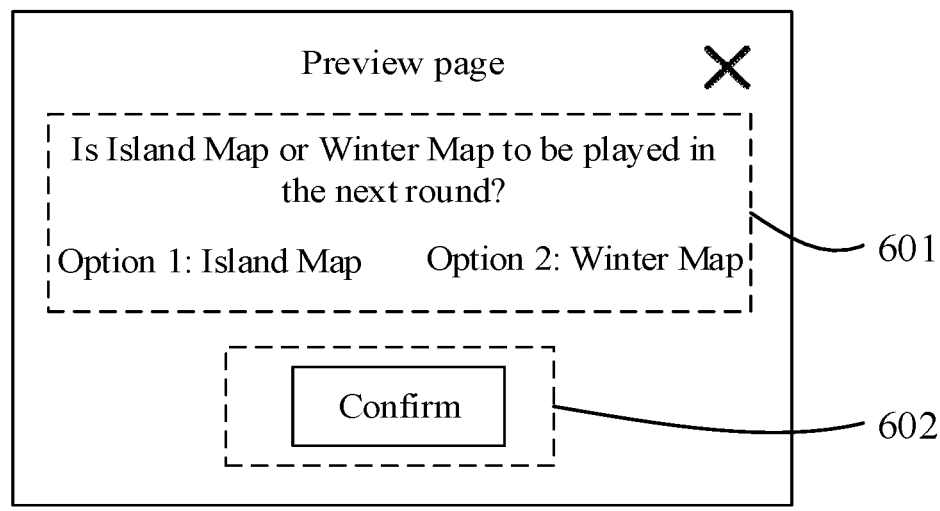
FIG. 5 is a diagram of a simple grammar rule according to an example embodiment.
FIG. 6 is a diagram of a vote preview page according to an example embodiment.

The preset grammar rule may be designed based on the Extended Backus Naur Form. Such a grammar consists of several productions, and each production consists of a symbol, a colon, and the sequence that can replace that symbol. FIG. 5 is a diagram of a simple grammar rule according to an example embodiment. As shown in FIG. 5, "\" indicates that the production may use either the sequence before or after the slash. Multiple sub-grammar rules can be combined by a series of slash-separated sequences. In the sub-grammar rules, a symbol or sequence of symbols inside square brackets "[ ]" represents an optional element that may be present or omitted. That is, in the process of matching the textual information with the sub-grammar rules, the string in the symbols may have no corresponding matching content. A string inside the symbols "< >" is defined as a rule name that is mandatory. In the matching process, the string inside the symbols is replaced by a string in the corresponding position of the textual information. In some embodiments, the string in the corresponding position of the textual information may be used as an option word.

The process in which the electronic device matches the textual information with the preset grammar rule can be implemented by using a compiler. The compiler may include a lexical analyzer and a syntax analyzer. The lexical analyzer is configured to convert a character sequence in the textual information into a word sequence. The syntax analyzer can analyze, according to the preset grammar rule, text composed of a plurality of word sequences and determine a syntax structure of the text. The electronic device may match strings in the textual information with strings in each sub-grammar rule by using the compiler. When the textual information is successfully matched with any sub-grammar rule, the electronic device obtains a string based on the sub-grammar rule, and uses this string as an option word. Here the position of the string in the textual information is the same as that of the rule name in the symbols "< >".

The schematic diagram of the simple grammar rule shown in FIG. 5 is taken as an example. As shown in FIG. 5, the electronic device receives voice information "Which one should I play in the next round: Island Map or Winter Map?" input by a user in Step 201 according to the preset sentence pattern, and converts the voice information into textual information in Step 202. The compiler matches the textual information with the grammar rule shown in FIG. 5. In some embodiments, the electronic device matches the textual information with each sub-grammar rule of the grammar rule by using the compiler. The sub-grammar rule 501 includes two rule names: "Option 1" and "Option 2". In response to detecting that the textual information is successfully matched with the sub-grammar rule through recognition, the electronic device acquires two strings in the textual information which correspond to "Option 1" and "Option 2" respectively, namely, "Island Map" and "Winter Map", and determines the strings as option words.

Step 204: The electronic device generates voting options based on the option words.

Step 205: The electronic device generates the question stem based on the textual information.

That the electronic device obtains the textual information and generates the question stem of the vote based on the textual information may be implemented in any one of the following manners.

(1) The electronic device determining the textual information as the question stem of the vote.

In this manner, the question stem of the vote can be generated quickly, thereby reducing time consumed in vote creation, and improving vote creation efficiency.

(2) The electronic device simplifies the textual information to obtain the question stem of the vote. In some embodiments, this operation is specifically implemented in the following steps.

Step 11: The electronic device determines a target word in the textual information, where the target word is assigned to a target part of speech.

The target part of speech may be set by a developer. One or more target parts of speech can be set according to an actual implementation scenario, such as pronoun, modal particle and other parts of speech that have little impact on semantics.

Step 12: The electronic device acquires remaining textual information by removing the target word from the textual information.

Step 13: The electronic device determines the remaining textual information as the question stem.

For example, the target parts of speech are set to pronoun and modal particle. When the textual information is "Which one should I play in the next round: Island Map or Winter Map?", the electronic device detects, through recognition, that the textual information includes the target words, that is, a pronoun and modal particle. As such, the electronic device deletes the pronoun and modal particle, and determines the remaining part of the textual information, namely, "Is Island Map or Winter Map to be played in the next round?", as the question stem of the vote.

By simplifying the textual information, the text content of the question stem of the vote can be simplified. Therefore, the semantics of the question stem of the vote can be clearer, the time for users to read the question can be reduced, and the vote efficiency can be improved.

In above embodiments, description is given in such an execution order: Voting option is generated before that question stem is generated. However, in some embodiments, the question stem may be generated before that the voting option is generated. Alternatively, both steps are performed simultaneously. The embodiment of the present disclosure does not impose any specific limitation to this.

Step 206: The electronic device creates the vote based on the question stem and the voting options.

The electronic device sends the question stem and the voting options to a server. The server creates the vote. This operation may be specifically implemented in the following manners.

After acquiring the question stem and the voting options, the electronic device sends a vote creation request to the server, where the vote creation request carries the question stem and the voting options. The server creates the vote based on the question stem and the voting options. After creating the vote, the server sends the vote to an electronic device at an audience side.

To improve the accuracy of vote creation, the electronic device may also provide a preview function before sending the vote creation request to the server. In response to detecting that a user clicks a confirm icon, the electronic device sends the vote creation request to the server. In other words, the method further includes: displaying, by the electronic device, a preview page of the vote in the first target area of a live stream. The vote preview page includes an information display area and the confirm icon. The information display area is used to display the question stem of the vote and voting options. Both the question stem and the voting options can be modified. The confirm icon function is configured to confirm information in the information display area, and that the vote creation is complete. FIG. 6 is a diagram of a vote preview page according to an example embodiment. The vote preview page includes an information display area 601 and a confirm icon 602.

It should be noted that, Step 204 to Step 206 illustrates a process of creating a vote by generating the question stem based on the textual information and generating the voting options based on the option words. However, in this process, the vote may be alternatively generated based on the question stem and voting options in another manner. This embodiment of the present disclosure does not impose any limitation to this.

It can be learned from the foregoing method according to the embodiments that, the vote is created by obtaining the voice information inputted by the user and automatically generating the question stem and the voting options based on the voice information. The user does not need to input a large amount of textual information as usual to describe the question stem and voting options, but can create a vote only by speaking. Therefore, the vote creation process is simplified, time consumed in vote creation is reduced, and the creation efficiency is improved.

For some live stream scenarios requiring continuous operation, in some embodiments, some live stream game scenarios requiring real-time manipulation of a game interface, a user only needs to perform simple speech recording, and the electronic device can automatically create a vote without interrupting the user's game operation. In this way, the continuity of the live stream process and high-quality live stream result is guaranteed.

To reduce the time consumed in matching the textual information with the preset phrases during voice recognition and improve the voice recognition efficiency, in some embodiments, the electronic device may filter the preset phrases to obtain a plurality of preset phrases related to the current live stream, and matches the preset phrases related to the current live stream with the decoded results. This operation may be implemented in any one of the following manners.

(1) Acquiring zone information when receiving the vote initiation instruction in a live stream; and determining the preset phrases based on the zone information.

The zone information is used to indicate a zone to which the live stream belongs. For example, for any live stream application, there may be a plurality of preset zones. In a live stream, a host may select a zone from the zones. For any zone, there may be some hot words that are unique to this zone. Therefore, the number of to-be-matched phrases can be reduced by establishing a correspondence between the zone and the hot words, and the processing efficiency can be improved.

(2) Acquiring a live image when receiving the vote initiation instruction in a live stream; determining live textual information by recognizing the live image; and determining the preset phrases based on the live textual information.

The live textual information is used to determine keywords in the content of the live stream. For example, for any live stream application, in a live stream, a host may add textual information to the live image for describing the current live stream content. In other words, keywords in the live stream content can be determined based on the live textual information. Any keyword in the live stream content may correspond to some specific hot words. Therefore, to-be-matched phrases can be filtered based on the correspondence between the keywords and the hot words in the live stream content, which reduces the number of the to-be-matched phrases and improves the processing efficiency.

(3) Acquiring a title when receiving the vote initiation instruction in a live stream; and determining the preset phrases based on the title.

The title of live stream indicates the subject of the live stream and may be used to determine a keyword of the live stream. For example, for any live stream application, in a live stream, a host may preset a title. Generally, it is considered that the title includes keywords of the live stream. Any live stream keyword may correspond to some specific hot words. Therefore, to-be-matched phrases can be filtered based on the correspondence between the keywords and the hot words in the live stream, which reduces the number of the to-be-matched phrases and improves the processing efficiency.

Due to the foregoing process of selecting preset phrases, the matching times between the textual information and the preset phrases can be further reduced, thereby avoiding unnecessary matching steps and improving the voice recognition efficiency.

Figure 7:
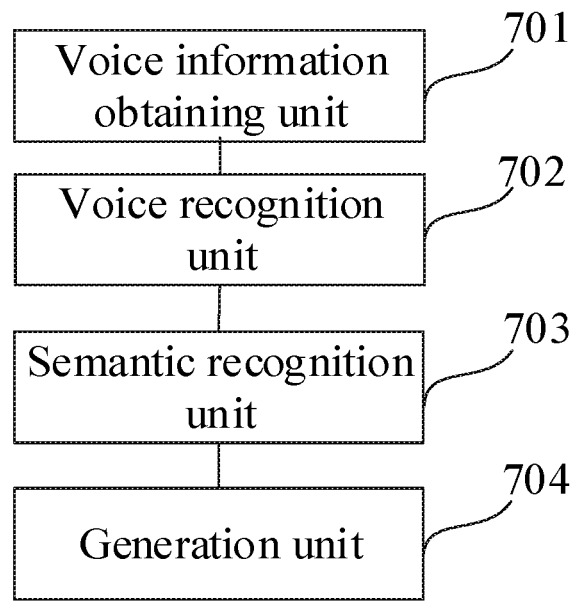
FIG. 7 is a block diagram of an apparatus for creating a vote according to an example embodiment.

FIG. 7 is a block diagram of an apparatus for creating a vote according to an example embodiment. Referring to FIG. 7, the apparatus includes a voice information obtaining unit 701, a voice recognition unit 702, a semantic recognition unit 703, and a generation unit 704.

The voice information obtaining unit 701 is configured to receive a vote initiation instruction to obtain voice information inputted currently.

The voice recognition unit 702 is configured to determine textual information by recognizing the voice information.

The semantic recognition unit 703 is configured to determine at least two option words based on semantic recognition of the textual information.

The generation unit 704 is configured to generate the question stem of a vote based on the textual information, and generate voting options based on the option words.

In some embodiments, the voice recognition unit 702 is configured to:
determining a plurality of decoded results by decoding the voice information, wherein each decoded result corresponds to an initial score;
for each of the decoded results,
matching the decoded result with a plurality of preset phrases;
adding one reward point to an initial score of the decoded result in response to that the decoded result matches with at least one of the preset phrases successfully; and
determining a decoded result with a highest score as the textual information corresponding to the voice information.

In some embodiments, the apparatus further includes: a first phrase acquisition unit, configured to: acquire zone information when receiving the vote initiation instruction in a live stream; and determine the preset phrases based on the zone information.

In some embodiments, the apparatus further includes: a second phrase acquisition unit, configured to: acquire a live image when receiving the vote initiation instruction in a live stream; determining live textual information by recognizing the live image; and determine the preset phrases based on the live textual information.

In some embodiments, the apparatus further includes: a third phrase acquisition unit, configured to: acquire a title when receiving the vote initiation instruction in a live stream, where the title is used to indicate the subject of the live stream; and determine the preset phrases based on the title.

In some embodiments, the semantic recognition unit 703 is configured to: determine the option words by matching the textual information with a preset grammar rule, where the preset grammar rule is used to define a sentence pattern for creating the vote.

In some embodiments, the generation unit 704 is configured to: determine a target word in the textual information, where the target word is assigned to a target part of speech; acquire remaining textual information by removing the target word from the textual information; and determine the remaining textual information as the question stem.

In some embodiments, the apparatus further includes: a display unit, configured to display a preview page of the vote in the first target area of a live stream.

A specific way in which each module of the apparatus in the above embodiment performs an operation has been described in detail in the related method embodiment. No detailed explanation is given herein.

Figure 8:
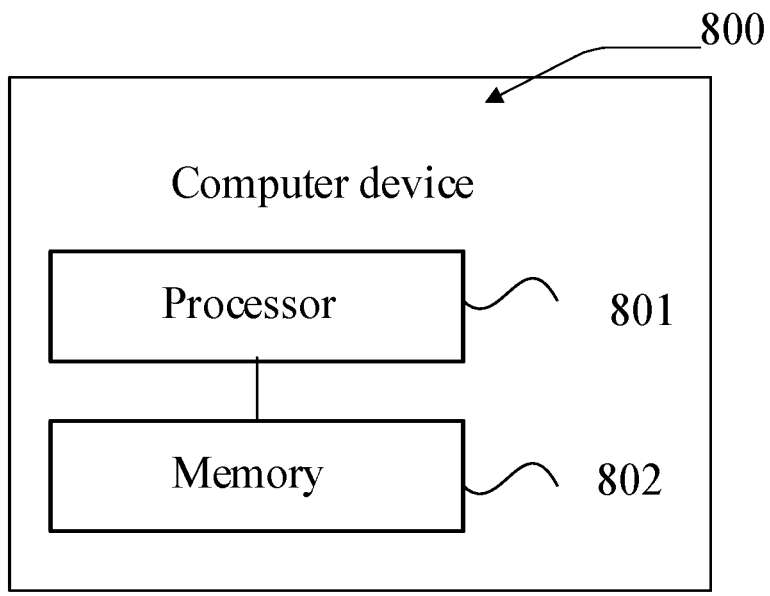
FIG. 8 is a block diagram of an electronic device for creating a vote according to an example embodiment.

FIG. 8 is a block diagram of an electronic device for creating a vote according to an example embodiment. The electronic device 800 may vary greatly depending on configuration or performance, and may include one or more central processing units (CPUs) 801 and one or more memories 802. The memory 802 stores at least one instruction. The at least one instruction is loaded and executed by the central processing unit 801 to implement the method for creating a vote provided in any of the above method embodiments. Certainly, the electronic device may further include components such as a wired or wireless network interface, a keyboard, and an input/output interface to perform input and output. The electronic device may further include other components configured to implement device functions. Details are not described herein.

An example embodiment further provides a computer readable storage medium for creating a vote. The computer readable storage medium, such as a memory 804, includes an instruction. The instruction can be executed by a central processing unit 820 of the electronic device 800 to perform the method in any of the above method embodiments. Optionally, the computer readable storage medium may be a non-transitory computer readable storage medium. For example, the non-transitory computer readable storage medium may be a ROM, a random access memory (RAM), a CD-ROM, a magnetic tape, a floppy disk, an optical data storage device, or the like.

After considering this specification and implementing the present disclosure disclosed herein, a person skilled in the art will be easy to figure out other embodiments of the present disclosure. This application is intended to cover any variation, usage or adaptive change of the present disclosure. These variations, usages or adaptive changes conform to the general principle of the present disclosure and include common knowledge or customary technical means in the technical field that are not disclosed in the present disclosure. The specification and embodiments are merely examples. The real scope and spirit of the present disclosure are indicated by the claims below.

It should be understood that, the present disclosure is not limited to the precise structures that are described above and shown in the accompanying drawings. Various modifications and changes may be made without departing from the scope of the present disclosure. The scope of the present disclosure is limited by only the appended claims.

The invention claimed is:

1. A method for creating a vote during a live stream, executed by an electronic device, comprising:
   receiving a vote initiation instruction to obtain voice information inputted currently;
   recognizing the voice information for obtaining textual information;
   determining at least two option words based on semantic recognition of the textual information;
   generating a question stem of the vote based on the textual information;
   generating voting options based on the option words for the vote; and
   displaying a preview page of the vote in a first target area of the live stream.

2. The method according to claim 1, wherein determining textual information comprises:
   determining a plurality of decoded results by decoding the voice information, wherein each decoded result corresponds to an initial score;
   for each of the decoded results,
      matching the decoded result with a plurality of preset phrases;
      adding one reward point to an initial score of the decoded result in response to that the decoded result matches with at least one of the preset phrases successfully; and
   determining a decoded result with a highest score as the textual information corresponding to the voice information.

3. The method according to claim 2, further comprising:
   acquiring zone information when receiving the vote initiation instruction in a live stream; and
   determining the preset phrases based on the zone information.

4. The method according to claim 2, further comprising:
   acquiring a live image when receiving the vote initiation instruction in a live stream;
   determining live textual information by recognizing the live image; and
   determining the preset phrases based on the live textual information.

5. The method according to claim 2, further comprising:
   acquiring a title when receiving the vote initiation instruction in a live stream, wherein the tile is used to indicate a subject of the live stream; and
   determining the preset phrases based on the title.

6. The method according to claim 1, wherein determining at least two option words comprises:
   determining the option words by matching the textual information with a preset grammar rule, wherein the preset grammar rule is used to define a sentence pattern for creating the vote.

7. The method according to claim 1, wherein generating a question stem of the vote comprises:
   determining a target word in the textual information, wherein the target word is assigned to a target part of speech;
   acquiring remaining textual information by removing the target word from the textual information; and
   determining the remaining textual information as the question stem.

8. An electronic device for creating a vote during a live stream, comprising:
   a processor; and
   a memory, configured to store an instruction executable by the processor, wherein
   the processor is configured to execute the instruction to perform:
      receiving a vote initiation instruction to obtain voice information inputted currently;
      recognizing the voice information for obtaining textual information;
      determining at least two option words based on semantic recognition of the textual information;
      generating a question stem of the vote based on the textual information; and
      generating voting options based on the option words for the vote; and
      displaying a preview page of the vote in a first target area of the live stream.

9. The electronic device according to claim 8, determining textual information comprises:
   determining a plurality of decoded results by decoding the voice information, wherein each decoded result corresponds to an initial score;
   for each of the decoded results,
      matching the decoded result with a plurality of preset phrases;
      adding one reward point to an initial score of the decoded result in response to that the decoded result matches with at least one of the preset phrases successfully; and
   determining a decoded result with a highest score as the textual information corresponding to the voice information.

10. The electronic device according to claim 9, the processor is further configured to perform:
   acquiring zone information when receiving the vote initiation instruction in a live stream; and
   determining the preset phrases based on the zone information.

11. The electronic device according to claim 9, the processor is further configured to perform:
   acquiring a live image when receiving the vote initiation instruction in a live stream;
   determining live textual information by recognizing the live image; and
   determining the preset phrases based on the live textual information.

12. The electronic device according to claim 9, the processor is further configured to perform:

acquiring a title when receiving the vote initiation instruction in a live stream, wherein the tile is used to indicate a subject of the live stream; and determining the preset phrases based on the title.

13. The electronic device according to claim 8, determining at least two option words comprises:

determining the option words by matching the textual information with a preset grammar rule, wherein the preset grammar rule is used to define a sentence pattern for creating the vote.

14. The electronic device according to claim 8, generating a question stem of the vote comprises:

determining a target word in the textual information, wherein the target word is assigned to a target part of speech;

acquiring remaining textual information by removing the target word from the textual information; and determining the remaining textual information as the question stem.

15. A non-transitory computer readable storage medium for creating a vote during a live stream, wherein when an instruction in the storage medium is executed by a processor of an electronic device, the electronic device performs:

receiving a vote initiation instruction to obtain voice information inputted currently;

recognizing the voice information for obtaining textual information;

determining at least two option words based on semantic recognition of the textual information;

generating a question stem of the vote based on the textual information; and generating voting options based on the option words for the vote; and displaying a preview page of the vote in a first target area of the live stream.

16. The computer readable storage medium according to claim 15, wherein determining textual information comprises:

determining a plurality of decoded results by decoding the voice information, wherein each decoded result corresponds to an initial score;

for each of the decoded results,
matching the decoded result with a plurality of preset phrases;
adding one reward point to an initial score of the decoded result in response to that the decoded result matches with at least one of the preset phrases successfully; and determining a decoded result with a highest score as the textual information corresponding to the voice information.

17. The computer readable storage medium according to claim 15, wherein determining at least two option words comprises:

determining the option words by matching the textual information with a preset grammar rule, wherein the preset grammar rule is used to define a sentence pattern for creating the vote.

18. The computer readable storage medium according to claim 15, wherein generating a question stem of the vote comprises:

determining a target word in the textual information, wherein the target word is assigned to a target part of speech;

acquiring remaining textual information by removing the target word from the textual information; and determining the remaining textual information as the question stem.

* * * * *